US006847761B2

United States Patent
Hamanaka

(10) Patent No.: US 6,847,761 B2
(45) Date of Patent: Jan. 25, 2005

(54) OPTICAL MODULE AND METHOD OF FORMING THE OPTICAL MODULE

(75) Inventor: Kenjiro Hamanaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 76 days.

(21) Appl. No.: 10/209,780

(22) Filed: Jul. 31, 2002

(65) Prior Publication Data

US 2003/0026537 A1 Feb. 6, 2003

(30) Foreign Application Priority Data

Jul. 31, 2001 (JP) .......................................... 2001-231581
Sep. 28, 2001 (JP) .......................................... 2001-299352

(51) Int. Cl.[7] .............................. G02B 6/32; G02B 6/34; G02B 6/30; G02B 5/32
(52) U.S. Cl. .............................. 385/33; 385/37; 385/49; 385/51; 359/19; 359/34
(58) Field of Search ........................ 385/14, 31, 33, 385/37, 49, 51; 359/1, 10, 15, 16, 19, 34

(56) References Cited

U.S. PATENT DOCUMENTS 4,819,224 A * 4/1989 Laude ........................... 385/37
5,557,695 A * 9/1996 Yamane et al. ................ 385/49
6,591,029 B1 * 7/2003 Lin et al. ....................... 385/17
2002/0186922 A1 * 12/2002 Hananaka ..................... 385/33
2004/0047558 A1 * 3/2004 Yasuda et al. ................. 385/33

FOREIGN PATENT DOCUMENTS

| JP | 02-123301 | 5/1990 |
| JP | 09-006166 | 1/1997 |

* cited by examiner

*Primary Examiner*—Akm Enayet Ullah
*Assistant Examiner*—Omar Rojas
(74) *Attorney, Agent, or Firm*—Merchant & Gould P.C.

(57) ABSTRACT

An object beam divided by a light dividing means 12 is caused to enter a photo-refractive polymer layer 6 through an optical fiber 23. On the other hand, a reference beam divided by the light dividing means 12 is irradiated on the photo-refractive polymer layer 6 through a lens 13 from the opposite side. In this manner, the object beam is superimposed on the reference beam in the photo-refractive polymer layer 6 to provide an interference fringe or pattern. Since a photo-refractive polymer has a specific characteristic whereby the refractive index changes according to the intensity of irradiation light and the change is fixed after the irradiation light is stopped, a diffraction grating 5 corresponding to the interference fringe is recorded on the photo-refractive polymer layer 6. This diffraction grating 5 exhibits a specific characteristic whereby the object beam emitted from the optical fiber 23 is emitted in the direction of the reference beam.

22 Claims, 11 Drawing Sheets

Semiconductor laser 11

Semiconductor laser 11

OPTICAL MODULE AND METHOD OF FORMING THE OPTICAL MODULE

BACKGROUND OF THE INVENTION

1. Field of the Invention

The present invention relates to an optical module provided with an optical fiber block and a microlens substrate or an optical module provided with the optical fiber block and a diffraction grating, and a method of forming such an optical module.

2. Description of the Prior Art

An optical module combining an optical fiber block with a microlens substrate is used as a device for optical communication. This optical module is designed to cause light from a light emitting diode to enter the microlens through an optical fiber to take it out as a collimated beam and to cause the collimated beam to enter the optical fiber through the microlens. Such a concrete structure is shown in FIGS. 14(a)–(c).

The optical module shown in FIG. 14(a) is provided in which an optical fiber block 102 into which an optical fiber 101 is inserted is integrally formed with a microlens substrate 104 on which a microlens is mounted, through a transparent spacer 105. On the other hand, the optical module shown in FIG. 14(b) is provided in which the optical fiber block 102 is directly secured to the microlens substrate 104. The optical module shown in FIG. 14(c) is provided to have the optical fiber block 102 and the microlens substrate 104 secured to a base 106.

Referring to FIG. 15, a plurality of optical fibers 101 is inserted into the optical fiber block 102 and a plurality of microlenses 103 corresponding to the plurality of optical fibers 101 is mounted on the microlens substrate 104. This structure is for example disclosed in Japanese Unexamined Patent Publication No. HEI 2-123301 (1990).

The microlens substrate 104 is made for example by a method whereby an area with a different refractive index is formed on a surface of a glass substrate by ion exchange through a mask, a method whereby resin of high refractive index is embedded in a depression formed by etching, a photopolymer molding method whereby ultraviolet-curing resin is press-molded on a surface of the glass substrate, or a sol-gel method.

On the other hand, the optical fiber block 102 is provided in which V-grooves are formed at regular intervals on a silicon substrate or the like and optical fibers are fixedly secured within these grooves. In addition to this structure, it is also known that a stainless steel substrate or a glass substrate is provided with holes in advance into which the optical fibers are inserted and fixedly secured.

In the optical module, it is essential for the optical fiber to coincide with an optical axis of the microlens for improvement of communication accuracy. If their optical axes do not coincide, an object beam does not coincide with the optical axis as shown in FIGS. 14 and 15.

A method of adjusting such an optical axis of a module is proposed and disclosed in Japanese Unexamined Patent Publication No. HEI 9-061666 (1997). In this prior art, a mask with a mesh-shaped pattern of the same array pitch as that of an optical fiber block and a collimating lens array (i.e., a microlens substrate) is disposed in front of a detector for detecting the shape of a light beam to cause the light to enter the collimating lens array through the optical fiber block. The light transmitted through the collimating lens array without being shielded by the mask is detected by the detector to adjust a relative position of the optical fiber block and the collimating lens array so that the light beam shape corresponding to each optical fiber can be equalized.

In the conventional methods of adjusting the optical axis including the method disclosed in Japanese Unexamined Patent Publication No. HEI 9-061666 (1997), since the adjustment is made by moving either of the optical fiber block or the microlens substrate, a special moving device is required and the adjustment itself becomes very rough.

In particular, many optical fibers are united with many microlenses in some optical modules. The microlense substrate can be provided with many microlenses in one or two-dimensional way with a comparatively high accuracy. However, in the optical fiber block, making the grooves or holes is an essential process. Further, an external diameter of the optical fiber itself is uneven and a core position for the external diameter of the optical fiber is also uneven. Accordingly, many optical fibers cannot be arranged in one or two-dimensional way with a high accuracy.

Further, in the optical fiber block consisting of many optical fibers, the direction and amount of deviation or misregistration of each optical fiber are uneven as shown in FIG. 13. Accordingly, even though the optical axis is adjusted in accordance with one optical fiber, the optical axis adjustment of the other optical fibers may be deteriorated.

SUMMARY OF THE INVENTION

It is therefore an object of the present invention to solve the above-mentioned problems and to provide an improved optical module and an improved method of forming the optical module.

To solve the above-mentioned problems, an optical module according to the invention which belongs to a first group is provided, which comprises an optical fiber block which is provided with one or a plurality of optical fibers in one or two-dimensional way and a microlens substrate which is provided in one or two-dimensional way with one or a plurality of microlenses adapted to collimate or concentrate an object beam from the optical fibers, characterized in that diffraction grating is provided on a surface of the microlens substrate or in the vicinity thereof to cause the object beam incident on the microlens from the optical fibers to outgo parallel or at a predetermined angle to an optical axis.

In the case where the number of the optical fiber and the microlens are plural, the diffraction grating is also provided plural according to the number of the microlens. However, a section of each diffraction grating has a different refraction index to correspond to the displacement or misregistration of each optical fiber.

For example, the following structures are considered to locate a diffraction grating: (a) the structure that a transparent spacer is inserted between the optical fiber block and the microlens substrate and the diffraction grating is provided on a surface of the microlens substrate contacting the transparent spacer or on a surface of the microlens substrate opposed to the transparent spacer; (b) the structure that the optical fiber block is directly connected to the microlens substrate and the diffraction grating is provided on a surface of the microlens substrate opposed to the surface connecting to the optical fiber block; or (c) the structure that the optical fiber block and the microlens substrate are secured to a base and the diffraction grating is provided on a surface of the microlens substrate.

The diffraction grating is for example made of photo-refractive material. According to the present invention, since the characteristics of the diffraction grating can be changed for the pair of each optical fiber and the microlens corresponding to the optical fiber, it is possible to obtain the same result as when adjustment of the optical axis is separately made.

A method of forming an optical module according to the present invention comprises the steps of:

dividing a laser beam from a laser beam source into an object beam and a reference beam in a condition that an optical fiber block to which an optical fiber is secured and a microlens substrate provided with a microlens corresponding to the optical fiber are fixedly secured, causing the object beam to enter the optical fiber, collimating or concentrating the object beam from the optical fiber by the corresponding microlens to cause it to emit from the microlens substrate, Upon forming a photo-refractive material layer on a surface of the microlens substrate or in the vicinity thereof, superimposing the object beam on the reference beam in the photo-refractive material layer, and forming a diffraction grating corresponding to the strength of light-intensity caused by this superposition in the photo-refractive material layer.

The reference beam can be a collimated beam with a light flux cross-sectional area covering an effective area of the entire microlens substrate or a collimated beam with a light flux cross-sectional area covering an effective area of each microlens of the microlens substrate.

To obtain the reference beam divided to cover the effective area of each microlens, it is necessary to prepare a microlens array different from the above. The reference beam is caused to enter the microlens array using another optical fiber block, a collimated beam with a light flux cross-sectional area covering the effective area is irradiated on each microlens forming an optical module through each microlens of the different microlens array.

It is desirable that the Gaussian beam waist of the collimated reference beam be situated a predetermined distance from the diffraction grating or the microlens substrate and the reference beam be a divergent spherical wave diverging from a position away a predetermined distance from the diffraction grating or the microlens substrate.

In such a structure, according to the present invention, even though there is some misregistration between optical axes of the optical fiber and the microlens corresponding to the optical fiber, the direction of the light flux can be deflected by the diffraction grating to cause the object beam to go out in the desired direction.

Further, since each diffraction grating is recorded using the reference beam on condition that the optical fiber and the microlens have been secured in advance, it is possible to deflect the object beam in the direction of the reference beam in accordance with each misregistration. Accordingly, even though the array of the optical fiber particularly in the optical fiber block is not necessarily accurate, it is possible to cause the beam array to emit of which the direction has been properly adjusted.

It is also possible to adjust a plurality of optical fibers and a plurality of microlenses corresponding to the optical fibers simultaneously and individually.

An optical module according to the invention which belongs to a second group to solve the above-mentioned problems comprises an optical fiber block holding an optical fiber and a transparent block of which one surface contacts to the optical fiber, wherein diffraction grating is provided on a surface of the transparent block opposed to the optical fiber block, characterized in that the diffraction grating is caused to emit light from one optical system emitting from the optical fiber toward the other optical system parallel or a predetermined angle to an optical axis of the optical fiber, or to concentrate the light incident from the other optical system toward the end surface of the optical fiber.

An optical module according to another invention which belongs to a second group comprises an optical fiber block holding an optical fiber and a transparent block disposed a predetermined distance away from the optical fiber block, wherein diffraction grating is provided on a surface of the transparent block opposed to the optical fiber block, characterized in that the diffraction grating is arranged to cause the light from one optical system emitting from the optical fiber to emit toward the other optical system parallel or at a predetermined angle to an optical axis of the optical fiber, or to concentrate the light incident from the other optical system toward an end surface of the optical fiber.

When the number of the optical fiber is plural, the diffraction grating must be provided plural to coincide with the number of the optical fiber, but the refraction index of each diffraction grating differs to coincide with the misregistration or positional deviation of each optical fiber.

The diffraction grating is for example made of a photo-refractive material. Since a specific characteristic of this diffraction grating can be changed for each optical fiber in the present invention, it is possible to obtain the same result as that obtained when the adjustment of an optical axis is made separately.

A method of forming an optical module according to the invention belonging to the second group comprises the steps of:

causing an optical fiber block holding an optical fiber to come into contact with a transparent block of which one surface is provided with a photo-refractive material layer so that the photo-refractive material layer is situated on the opposite side of the optical fiber, dividing a laser beam from a laser beam source into an object beam and a reference beam, causing the object beam to enter the optical fiber held by the optical fiber block, superimposing the object beam from the optical fiber on the reference beam in the photo-refractive material layer, and forming diffraction grating corresponding to the strength of light intensity caused by this superimposition on the photo-refractive material layer.

Another method of forming an optical module according to the invention belonging to the second group comprises the steps of disposing an optical fiber block holding an optical fiber and a transparent block of which one surface is provided with a photo-refractive material layer a predetermined distance away from each other so that the photo-refractive material layer faces the optical fiber block, dividing a laser beam from a laser beam source into a object beam and a reference beam, causing the object beam to enter the optical fiber held by the optical fiber block, superimposing the object beam from the optical fiber on the reference beam in the photo-refractive material layer, and forming diffraction grating corresponding to the strength of light intensity caused by this superimposition on the photo-refractive material layer.

The reference beam can be a collimated beam with a light flux cross-sectional area covering an effective area of the entire transparent block or a collimated beam with a light flux cross-sectional area covering an effective area of each diffraction grating formed in the transparent block.

To obtain the reference beam divided to cover the effective area of each diffraction grating, it is necessary to prepare a separate microlens array from the above. The reference beam is caused to enter this microloens array using a separate optical fiber block and the collimated beam with the light flux cross-sectional area covering the effective area is irradiated on each diffraction grating forming the optical module.

It is desirable that the Gaussian beam waist of the collimated reference beam be situated a predetermined distance away from the diffraction grating formed and that the reference beam be a divergent spherical wave diverging from a position a predetermined distance away from the diffraction grating formed.

In this manner, even though there is some misregistration or deviation between the optical fiber and the optical axis, the direction of the light flux can be deflected by the diffraction grating to cause the object beam to emit in the desired direction.

Further, since each diffraction grating is recorded using the reference beam based on the optical fiber secured in advance, it is possible to deflect the object beam in the direction of the reference beam in accordance with each misregistration or deviation. Accordingly, even though the array of the optical fiber is not necessarily accurate especially in the optical fiber block, it is possible to emit the beam array of which the direction has been properly adjusted.

Still further, the adjustment of a plurality of optical fibers and a plurality of diffraction gratings corresponding to the optical fibers can also be made simultaneously and separately.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS (Embodiments Belonging to a First Group)

Figure 1:
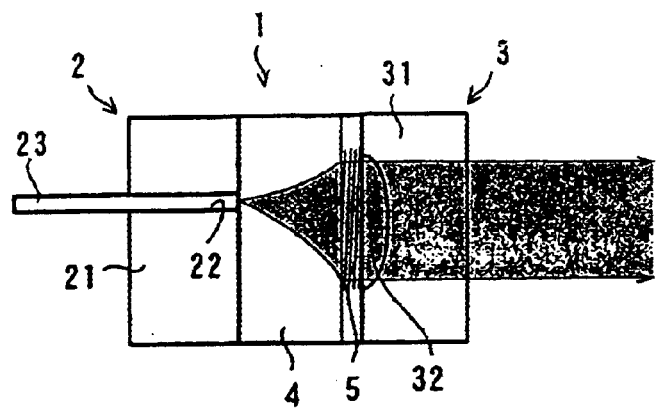
FIGS. 1(a)–(c) are cross-sectional views of an optical module according to the present invention which belongs to a first group in which a singular number of an optical fiber and a microlens is shown as one example.
Figure 1:
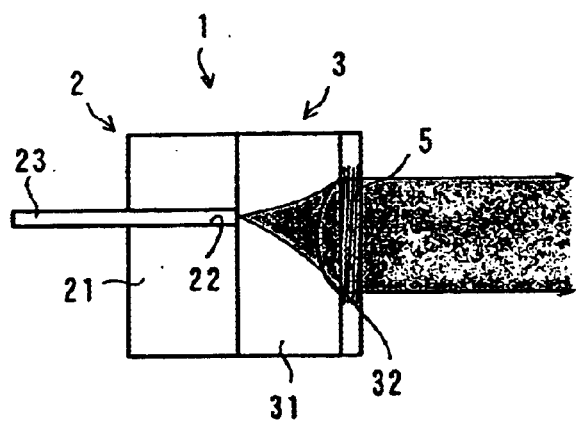
Figure 1:
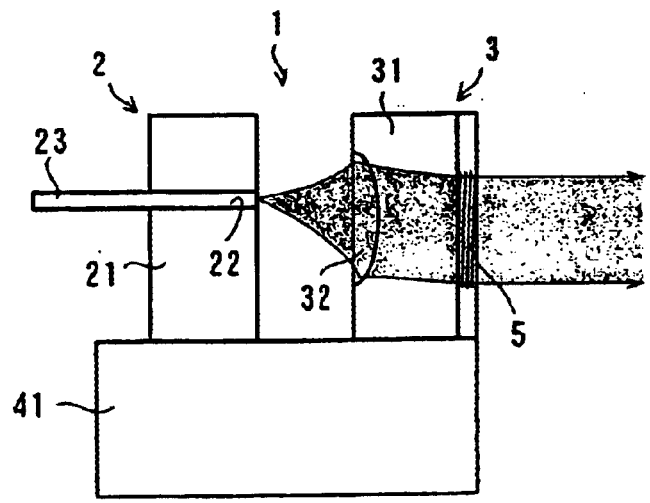

Preferred embodiments of the present invention belonging to a first group will now be described with reference with the accompanying drawings. FIGS. 1(a)–(c) are cross-sectional views showing one example of an optical module according to the present invention in which one piece each of an optical fiber and a microlens is employed. An optical module 1 shown in FIG. 1(a) is provided with a transparent spacer 4 between an optical fiber block 2 and a microlens substrate 3. The optical fiber block 2 is provided to have a silicon substrate 21 formed with a groove or a hole 22 into which a single mode optical fiber 23 is secured. The optical fiber block 2 is not limited to this structure, but, for example, a stainless steel substrate or a glass substratecan be formed with a hole in advance into which the optical fiber is inserted and secured.

A microlens 32 is formed on a glass substrate 31 to correspond to the optical fiber. The microlens can be a light focusing lens. It can be formed by a photopolymer molding method whereby a convex microlens is molded on a surface of a glass substrate using an ultraviolet curing resin, a method whereby many depressions are formed on a surface of a glass substrate by etching through a mask and a resin of high refractive index is filled into the depressions, or a method whereby an ion is diffused on a surface of a glass substrate through a mask to change a refractive index.

In the case where the optical axis of the optical fiber 23 does not register with that of the microlens 32, the object beam emitting from the microlens 32 does not run parallel to the optical axis. Accordingly, the optical module 1 shown in FIG. 1(a) has diffraction grating inserted between the microlens 32 of the microlens substrate 3 and the transparent spacer 4 to cause the object beam to emit parallel to the optical axis. It is also possible to provide the diffraction grating 5 on a surface of the microlens substrate 3 opposite to the transparent spacer 4.

The optical module shown in FIG. 1(b) is not provided with the transparent spacer 4. The optical fiber block 2 is directly united with the microlens substrate 3, wherein the diffraction grating is provided on a surface of the microlens substrate 3 opposite to the optical fiber block 2. In the case of the optical module shown in FIG. 1(b), the distance between the end of the optical fiber 23 and the microlens 32 is adjusted by the thickness of the microlens substrate.

In the optical module 1 shown in FIG. 1(c), the optical fiber block 2 and the microlens substrate 3 are fixedly secured to a base 41. The diffraction grating is provided on a surface of the microlens substrate 3 opposite to the surface thereof on which the microlens 32 is formed. It is also possible to provide the diffraction grating on the surface of the microlens substrate on which the microlens is formed.

A means for forming the diffraction grating 5 will now be explained with reference to FIG. 2. The optical module 1 shown in FIG. 1(a) is taken as an example. A photo-refractive polymer layer 6 is formed in advance on the surface of the microlens substrate 3 on which the microlens is formed. The photo-refractive polymer layer 6 is a material with a specific characteristic whereby the refractive index changes according to the intensity of the irradiation light and the change of the refractive index is fixed after the irradiation of light is stopped. It is also possible to use the other photo-refractive material as far as it has such a characteristic.

Figure 2:
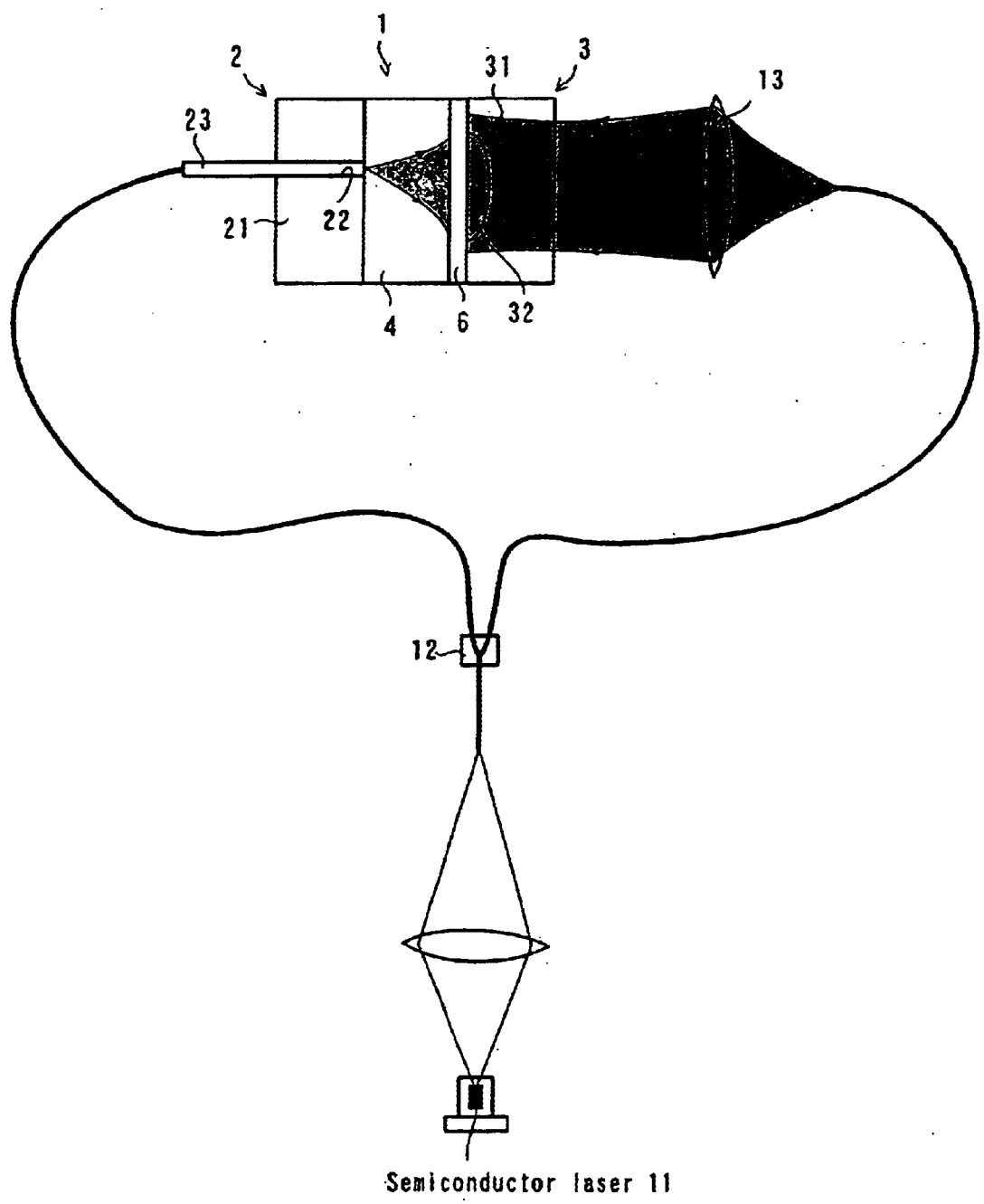
FIG. 2 is a view showing a method for forming the optical module shown in FIG. 1(a)

Referring to FIG. 2, a reference numeral 11 is a semiconductor laser serving as a light source and 12 is a light dividing means for dividing a laser beam from the semiconductor laser 11 into an object beam and a reference beam. A reference numeral 13 is a lens for collimating the reference beam relative to the optical axis to allow it to enter the photo-refractive polymer layer 6 from a side opposite to the object beam.

The reference beam is made to be a collimated beam having a light flux cross-sectional area covering an effective area of the microlens 32 by the lens 13. A beam waist of a Gaussian beam of the collimated reference beam is spaced apart a predetermined distance from the diffraction grating 5 or the microlens substrate 3. The reference beam is a divergent spherical wave diverging from a position a predetermined distance away from the diffraction grating 5 or the microlens substrate 3.

In this manner, the object beam divided by the light dividing means 12 is caused to enter the optical fiber 23, while the object beam emitted from the optical fiber 23 is caused to enter the photo-refractive polymer layer 6. On the other hand, the reference beam divided by the light dividing means 12 is irradiated on the photo-refractive polymer layer 6 through the lens 13 from the opposite side.

Then, the object beam is superimposed on the reference beam in the photo-refractive polymer layer 6 to form an interference fringe or pattern. This interference fringe corresponds to the strength of light intensity. As described above, the photo-refractive polymer has a specific characteristic whereby the refractive index changes according to the strength of the irradiation light and this change is fixed after the irradiation light is stopped. Thus, the diffraction grating corresponding to the interference fringe is recorded on the photo-refractive polymer layer 6.

The diffraction grating 5 recorded in this manner exhibits a specific characteristic whereby the object beam emitted from the optical fiber 23 is emitted in the direction of the reference beam, i.e., parallel to the optical axis from the microlens 32. (According to the principle of holography, the diffraction grating recorded by the object beam and the reference beam diffracts the object beam, once entered, in the original direction of the reference beam.) The diffraction grating 5 only has a deflection function of light, but does not have a focusing function or the like. However, the diffraction grating is automatically given a function for correcting an aberration that the microlens 32 has.

The optical modules shown in FIGS. 1(b) and (c) are also formed in the same method.

Figure 3:
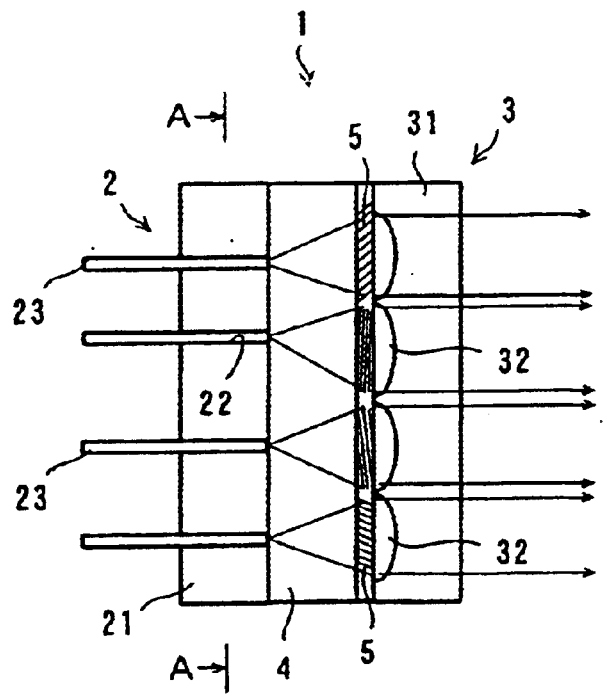
FIG. 3 is a cross-sectional view of the optical module according to the present invention which belongs to the first group in which a plural number of optical fibers and microlenses are shown as one example.
Figure 4:
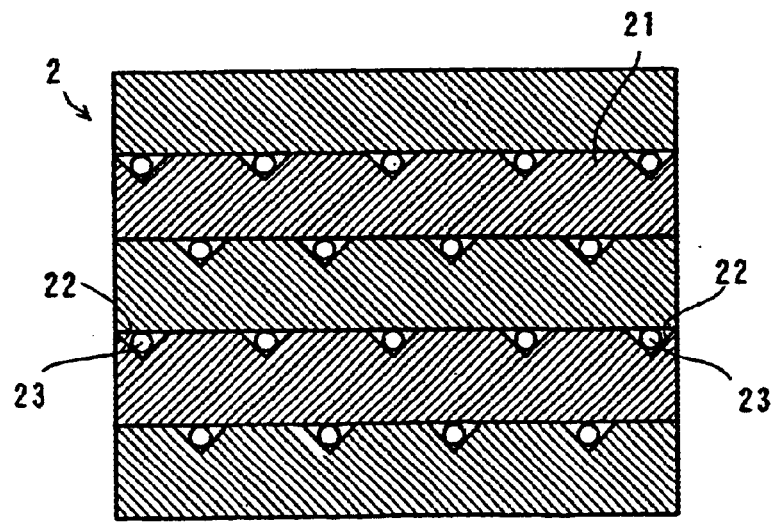
FIG. 4 a view taken along the line A—A of FIG. 3.

FIG. 3 is a cross-sectional view of an optical module according to the invention which belongs to the first group in which a plurality of optical fibers and microlenses are provided and FIG. 4 is a view taken along the line A—A of FIG. 3. In this embodiment, the optical fibers 23 arranged in one or two-dimensional way are held by the optical fiber block 2, while the microlenses 32 arranged in one or two-dimensional way are formed on the microlens substrate 3. Disposed between the optical fiber block 2 and the microlens substrate 3 is the transparent spacer 4 and the diffraction grating 5 is provided between the microlenses 32 and the transparent spacer 4. The optical module can be constructed to have the same structure as that shown in FIGS. 1(b) and (c).

In the case where the number of the optical fiber and the microlens is plural, misregistration of the optical fibers 23 and the microlenses 32 differs respectively. Accordingly, each diffraction grating 5 which makes the object beam emitted from each microlens 32 parallel to an optical axis has a different characteristic in each section.

Figure 5:
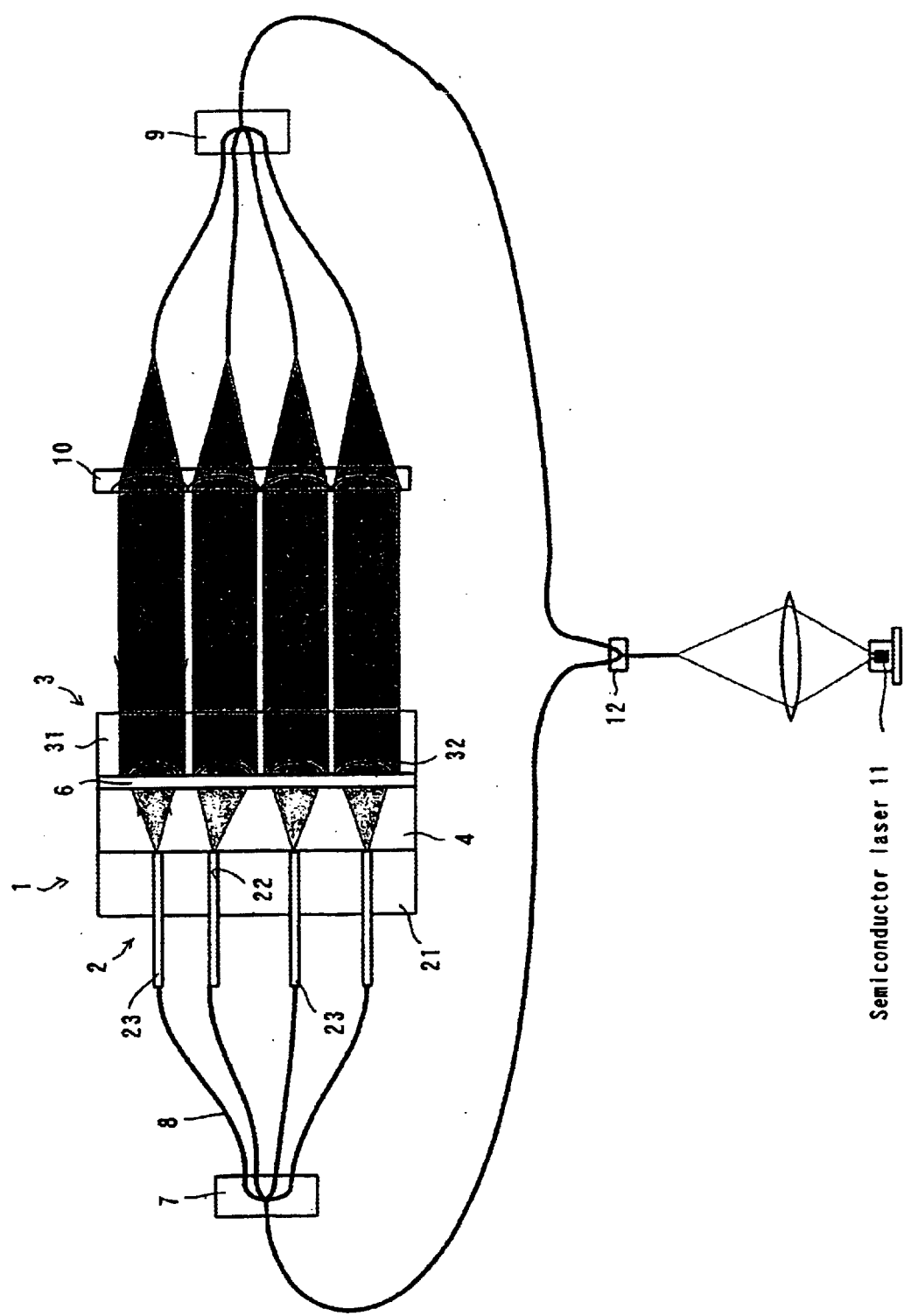
FIG. 5 is a view explaining a method for forming an optical module shown in FIG. 3.

FIG. 5 is a view explaining a method of forming the optical module of FIG. 3. According to this method, the object beam divided by a light dividing means 7 is caused to enter each optical fiber 23 of the optical fiber block 2 through optical fibers 8. On the other hand, the reference beam is caused to enter the microlens substrate 3 through a light dividing means 9 and a microlens array 10. The diffraction grating 5 corresponding to an interference fringe by the object beam and the reference beam is formed in the photo-refractive polymer layer 6 in the same manner as the previous embodiment.

In the figure, a light flux cross-sectional area of the reference beam is provided to cover an effective area of each microlens 32. However, one collimated lens can be used in place of the microlens array 10 to provide a collimated beam with the light flux cross-sectional area which covers the effective area of the entire microlens substrate 3.

Figure 6:
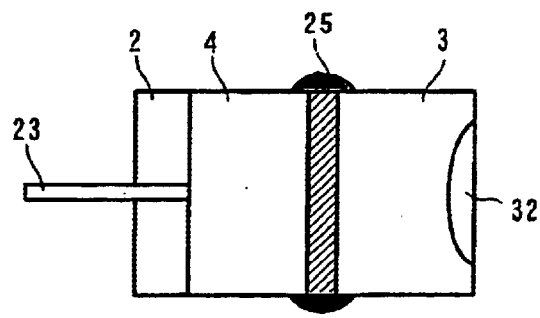
FIG. 6 is a view showing another embodiment of the optical module according to the present invention which belongs to the first group.

FIG. 6 is a view showing another embodiment of the optical module. In this embodiment, the diffraction grating 5 is provided between the optical fiber block 2 and the microlens substrate 3 and the outside of the diffraction grating 5 is sealed by a hermetic sealing member 25.

Figure 7:
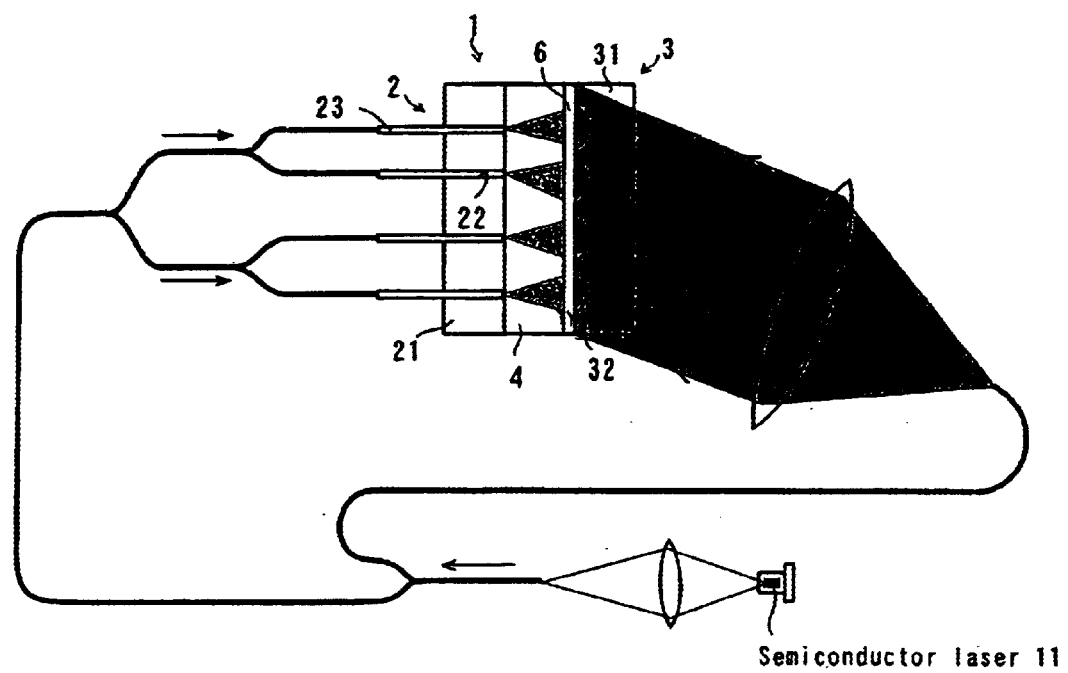
FIG. 7 is a view explaining another embodiment for forming the optical module according to the present invention which belongs to the first group.

In the above-mentioned embodiments, there are shown examples in which the object beam emitted from the microlens runs parallel to the optical axis by forming the diffraction grating. However, according to the present invention, it is possible to positively cause the object beam to emit at a predetermined angle to the optical axis. Namely, FIG. 7 is a view explaining another embodiment of a method for forming the optical module, in which the reference beam is caused to enter the microlens substrate 3 at a predetermined angle to the optical axis of the microlens 32.

The reference beam in the case where the diffraction grating is recorded and formed is oriented in the same direction as the light emitted in the actual use condition. Accordingly, if the reference beam is caused to enter at a predetermined angle, it is possible to form the diffraction grating 5 corresponding to the incident angle.

(Embodiments Belonging to a Second Group)

Embodiments of the invention belonging to a second group will now be described. FIGS. 8(a) and (b) are cross-sectional views showing one example of an optical module according to the invention which belongs to the second group in which the number of the optical fiber and the microlens is singular. An optical module 200 shown in FIG. 8(a) is constructed to have the optical fiber block 2 come into contact with the transparent block 4. The optical fiber block 2 has a silicon substrate 21 formed with a groove or a hole 22 to which a single mode optical fiber 23 is fixedly secured. The optical fiber block 2 is not limited to this structure, but for example, it is possible to make a hole on a stainless steel substrate or a glass substrate in advance into which the optical fiber is inserted and secured.

The diffraction grating is provided on a surface of the transparent block 4 opposed to the optical fiber block 2 to emit the object beam parallel to the optical axis. In the present embodiment, the diffraction grating 5 also exhibits a function as a condensing lens that makes an optical path of the object beam parallel to the optical axis and causes the object beam to emit as a collimated beam.

Figure 8:
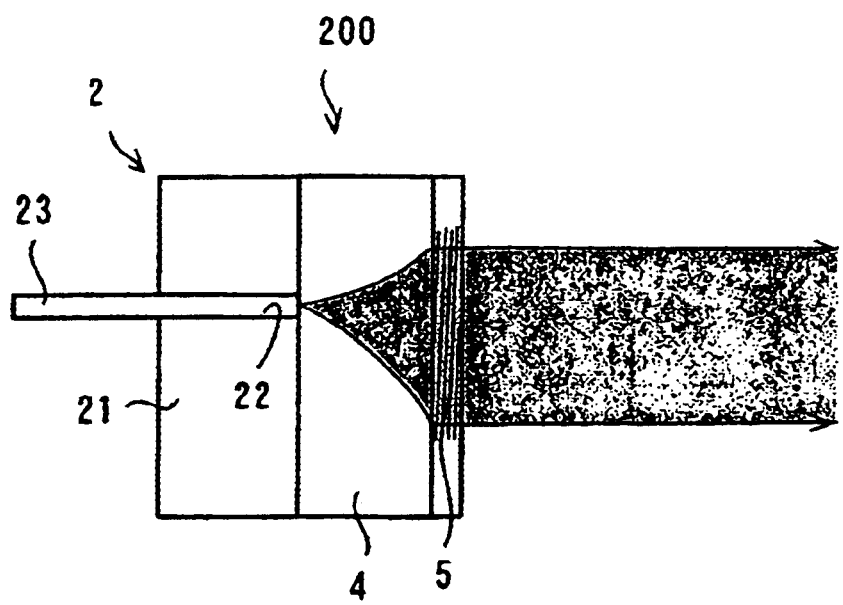
FIGS. 8(a) and (b) are cross-sectional views of an optical module according to the present invention which belongs to a second group in which a singular number of an optical fiber and a microlens is shown as one example.
Figure 8:
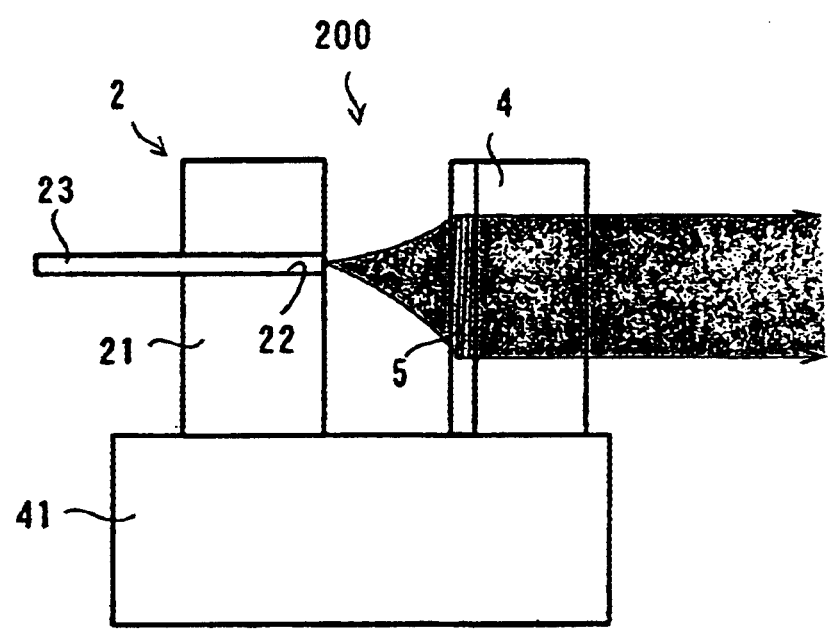

The optical module 200 show in FIG. 8(*b*) is provided to have the optical fiber block 2 and the transparent block 4 secured to a base 41. The diffraction grating 5 is provided on a surface of the transparent block 4 facing an emitting end of the optical fiber 23.

A means for forming the diffraction grating 5 will now be described with reference to FIG. 9. The optical module 200 shown in FIG. 8(*a*) is taken here as an example. First, the transparent block 4 is united with the optical fiber block 2. A photo-refractive polymer layer 6 is formed in advance on a surface of the transparent block 4 opposed to the optical fiber block 2. The photo-refractive polymer layer 6 is a material with a specific characteristic whereby the refractive index changes according to the intensity of irradiation light and such a change is fixed after the light irradiation is stopped. It is also possible to use the other photo-refractive material as far as it has such a character.

Figure 9:
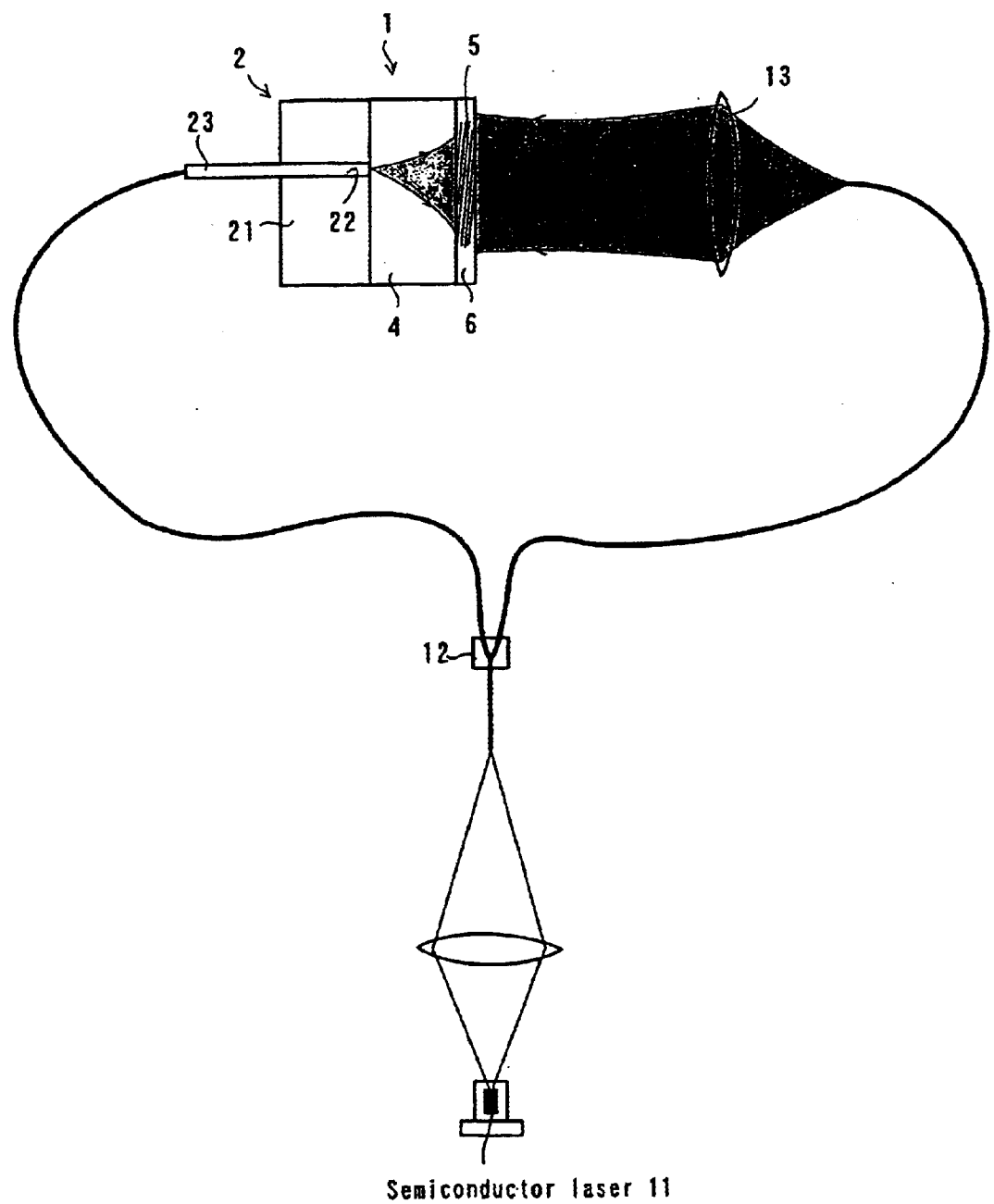
FIG. 9 is a view explaining a method for forming the optical module shown in FIG. 8(a)

In FIG. 9, a reference numeral 11 is a semiconductor laser as a light source and 12 is a light dividing means for dividing the laser beam into an object beam and a reference beam. A reference numeral 13 is a lens that makes the reference beam parallel to an optical axis to cause the collimated beam to enter the photo-refractive polymer layer 6.

The reference beam is changed to the collimated beam with a light flux cross-sectional area which covers a effective area of the diffraction grating 5 formed on the photo-refractive polymer layer 6. A beam waist of the Gaussian beam of the collimated reference beam is spaced apart a predetermined distance from the photo-refractive polymer layer 6. The reference beam is also a divergent spherical wave diverging from a position spaced apart a predetermined distance from the photo-refractive polymer layer 6.

In this manner, the object beam divided by the light dividing means 12 is caused to enter the optical fiber 23 and then, the object beam emitted from the optical fiber 23 is caused to enter the photo-refractive polymer layer 6. On the other hand, the reference beam divided by the light dividing means 12 is irradiated on the photo-refractive polymer layer 6 from the opposite side.

Then, the object beam is superimposed on the reference beam in the photo-refractive polymer layer 6 to form an interference fringe. This interference fringe corresponds to the strength of light intensity and the photo-refractive polymer has a specific characteristic whereby the refractive index changes according to the intensity of the irradiation light and this change is also fixed after the irradiation light is stopped. Thus, the diffraction grating 5 corresponding to the interference fringe is recorded on the photo-refractive polymer layer 6.

The diffraction grating 5 recorded in this manner exhibits a specific characteristic whereby it emits the object beam emitted from the optical fiber 23 in the direction of the reference beam, i.e., parallel to the optical axis of the optical fiber 23. (According to the principle of holography, the diffraction grating recorded by the object beam and the reference beam diffracts the object beam in the original direction of the reference beam when the object beam enters.)

The optical module shown in FIG. 8(*b*) can also be formed in the same manner as above.

Figure 10:
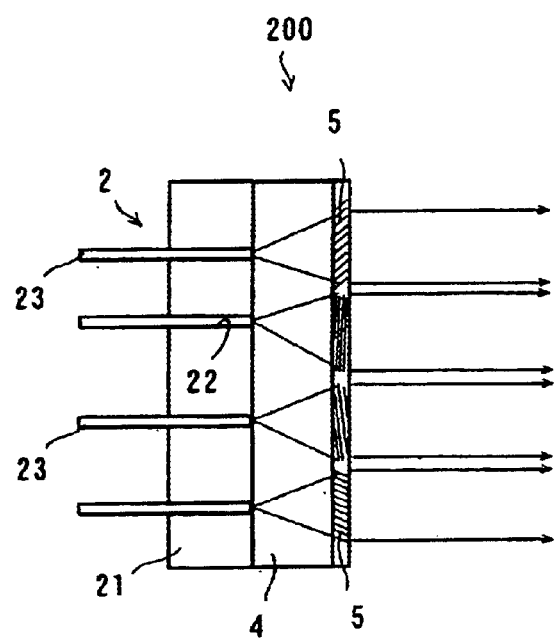
FIG. 10 is a cross-sectional view of the optical module according to the present invention which belongs to the second group in which a plural number of optical fibers and microlenses are shown as one example.

FIG. 10 is a cross-sectional view of the optical module according to the invention belonging to the second group in which the number of the optical fiber and the microlens is plural. In this embodiment, the optical fiber block 2 holds the optical fibers 23 arranged in one or two-dimensional way and the transparent block 4 is provided to come into contact with one side of the optical fiber block 2. This transparent block 4 is provided with the diffraction grating 5 corresponding to each optical fiber 23. The optical module can be constructed to have the same structure as that shown in FIG. 8(*b*).

In the case where a plurality of optical fibers 23 is provided, misregistration of each optical fiber 23 differs respectively. Accordingly, each diffraction grating which makes the object beam emitted from each optical fiber 23 parallel to the optical axis also has a different characteristic in each section.

Figure 11:
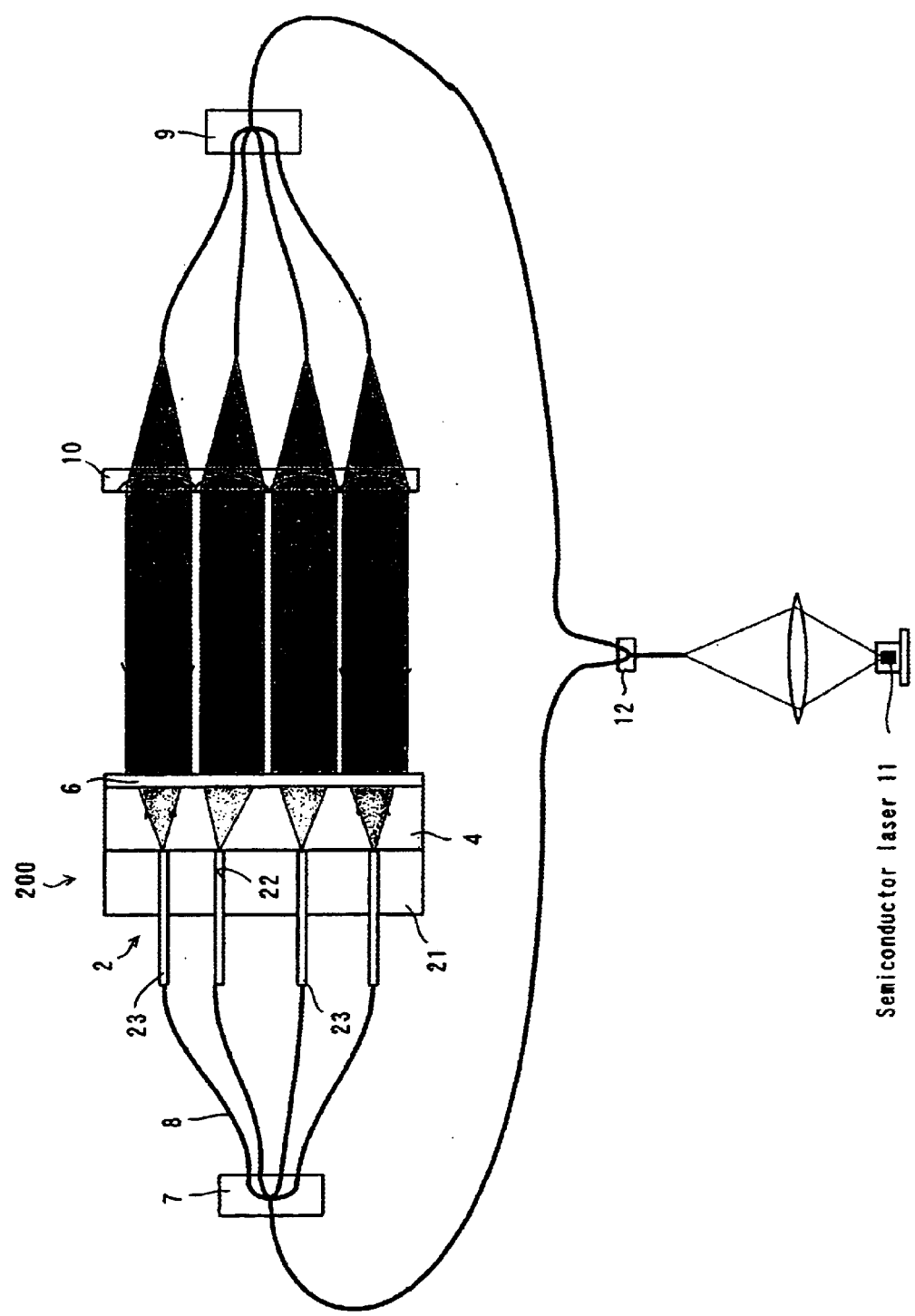
FIG. 11 is a view explaining a method for forming the optical module shown in FIG. 10.

FIG. 11 is a view explaining a method of forming the optical module of FIG. 10. In this method, the object beam divided by the light dividing means 7 is caused to enter each optical fiber 23 of the optical fiber block 2 through the optical fibers 8. On the other hand, the reference beam is caused to enter the photo-refractive polymer later 6 through the light dividing means 9 and the microlens array 10. The diffraction grating 5 corresponding to the interference fringe by the object beam and the reference beam is formed in the photo-refractive polymer layer 6 in the same manner as the previous embodiment.

In the example shown in the figure, a light flux cross-sectional area of the reference beam is provided to cover an effective area of each diffraction grating 5 of the photo-refractive polymer layer 6. However, one collimated lens can be used in place of the microlens array 10 to provide a collimated beam with a light flux cross-sectional area which covers the effective area of the entire photo-refractive polymer layer 6.

Figure 12:
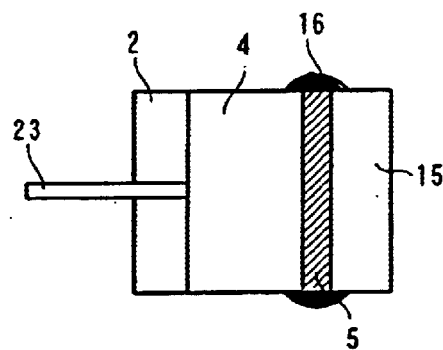
FIG. 12 is a view showing another embodiment of the optical module which belongs to the second group.

FIG. 12 is a view showing another embodiment of the optical module in which a transparent cover 15 is provided outside the transparent block 4 to protect the diffraction grating 5. In this case, a hermetic seal member 16 is provided to seal the outside of the diffraction grating 5.

Figure 13:
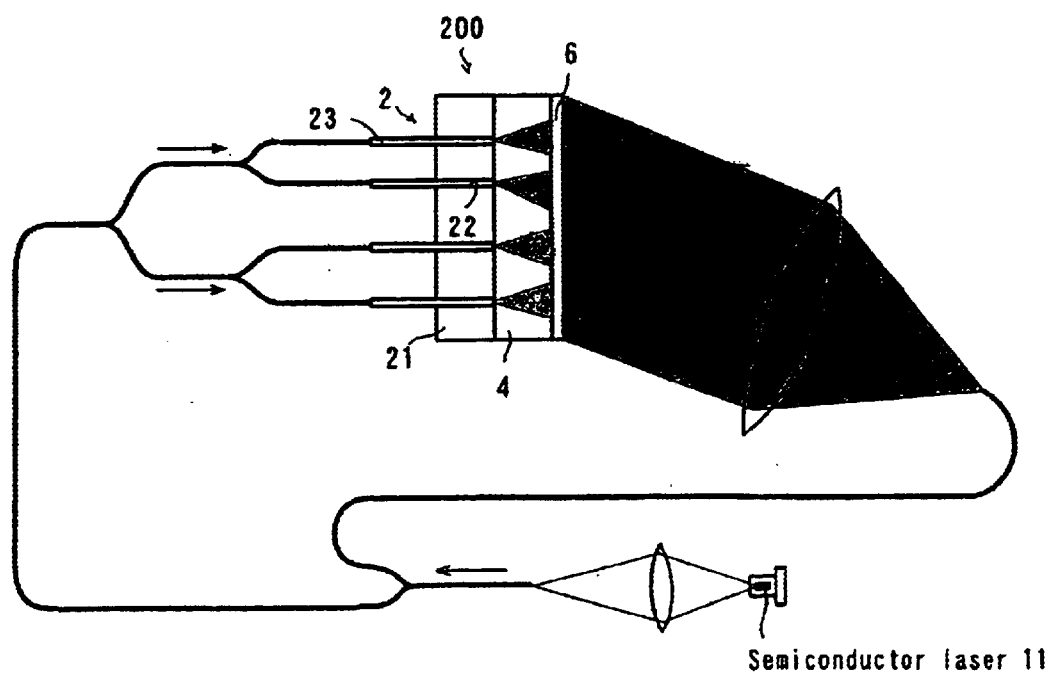
FIG. 13 is a view explaining another embodiment of a method for forming the optical module which belongs to the second group.
Figure 14:
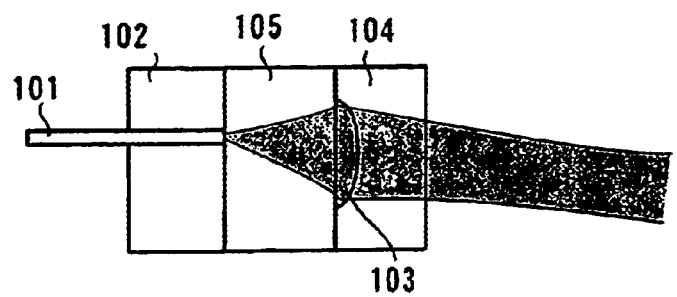
FIG. 14 are views explaining a malfunction of a conventional optical module.
Figure 14:
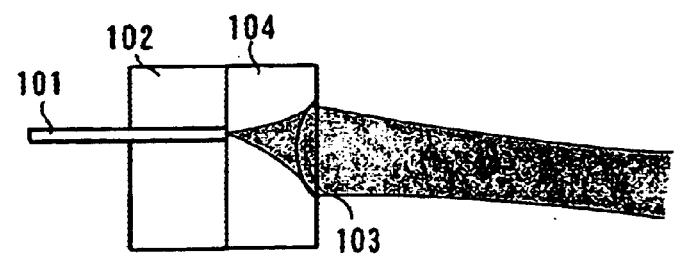
Figure 14:
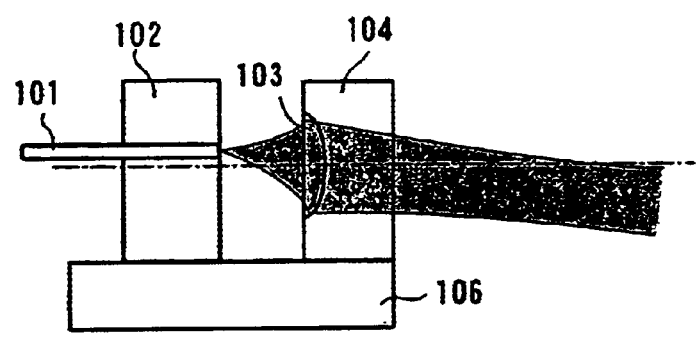
Figure 15:
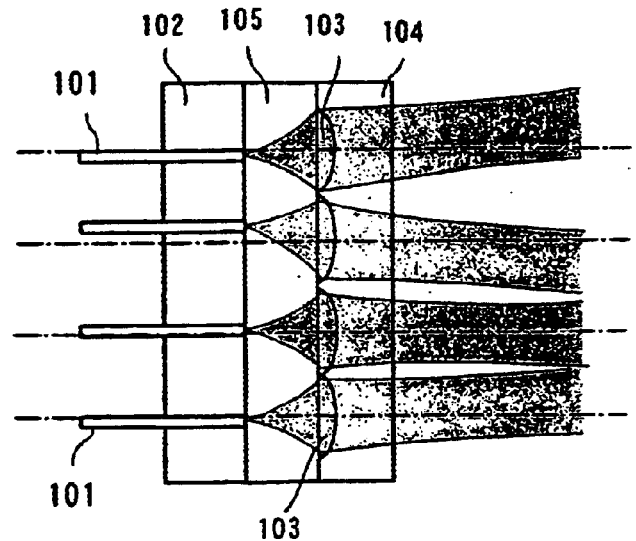
FIG. 15 is a view explaining another malfunction of the conventional optical module.

In the embodiments above, there is shown an example in which formation of the diffraction grating makes the object beam emitted from the optical module parallel to the optical axis. However, according to the present invention, it is possible to cause the object beam to positively emit at a predetermined angle to the optical axis. Namely, FIG. 13 is a view explaining another embodiment of a method of forming the optical module. In this embodiment, the reference beam is caused to enter at a predetermined angle to the optical axis of the optical fiber 23.

The reference beam in the case where the diffraction grating 5 is recorded and formed is oriented in the same direction as the light emitted in the actual use condition. Accordingly, if the reference beam is caused to enter at a predetermined angle, it is possible to form the diffraction grating 5 corresponding to the incoming or incident angle.

As described above, according to the invention belonging to the first group, even though there is some misregistration or positional deviation between the optical fiber and the optical axis of the microlens corresponding to the optical fiber, the direction of the light flux can be deflected by the diffraction grating to cause the object beam to emit in the desired direction.

Further, since each diffraction grating is recorded using the reference beam based on the optical fiber and the microlens which are fixed in advance, it is possible to deflect the object beam in the direction of the reference beam in response to each misregistration of the optical fibers. Accordingly, even though the array of the optical fibers especially in the optical fiber block is not necessarily accurate, it is possible to emit the beam of which the direction has been properly adjusted. An aberration of the microlens can also be automatically corrected.

In particular, even when the optical fiber block and the microlens substrate are composed of many optical fibers and many microlenses, each diffraction grating corresponding to the misregistration of each optical fiber and microlens is simultaneously formed. It is therefore extremely effective.

According to the invention belonging to the second group, the direction of light flux can be deflected and condensed by the diffraction grating. Accordingly, it is possible to cause the object beam to emit in the desired direction as a collimated beam without employing the lens.

Since each diffraction grating is recorded using the reference beam based on the prefixed optical fiber, it is possible to deflect the object beam in the direction of the reference beam in response to each misregistration of the optical fibers. Accordingly, even though the array of the optical fibers especially in the optical fiber block is not necessarily accurate, it is possible to cause the beam to emit of which the direction has been properly adjusted.

In particular, even in the case where the optical fiber block holds many optical fibers, a separate diffraction grating corresponding to the misregistration of each optical fiber is simultaneously formed. It is therefore extremely effective.

What is claimed is:

1. An optical module comprising:
   an optical fiber block in which a plurality of optical fibers is arranged in one or two-dimensional way; and
   a microlens substrate on which a plurality of microlenses are arranged in one or two-dimensional way so as to correspond to the optical fibers, each microlens collimating or condensing an object beam from each optical fiber wherein a diffraction grating is provided on a surface of the microlens substrate or in the vicinity thereof so as to be positioned such that the light incident on or emitted from each microlens is incident thereon, and the diffraction grating has a function of causing the object beam incident on each microlens via each optical fiber to emit such that the optical axis of the object beam is parallel with respect to each other.

2. The optical module according to claim 1, wherein a transparent spacer is inserted between the optical fiber block and the microlens substrate and the diffraction grating is provided on a surface of the microlens substrate contacting the transparent spacer or on the opposite surface thereof.

3. The optical module according to claim 1, wherein the microlens substrate is directly united with the optical fiber block and the diffraction grating is provided on a surface of the microlens substrate opposite to the surface with which the optical fiber block is united.

4. The optical module according to claim 1, wherein the optical fiber block and the microlens substrate are fixedly secured to a base and the diffraction grating is provided on a surface of the microlens substrate.

5. The optical module according to claim 1, wherein the diffraction grating is made of a photo-refractive material of which the refractive index changes according to the intensity of light and the change is fixed.

6. A method of forming an optical module having an optical fiber block holding one optical fiber therein and a microlens substrate provided with one microlens, comprising the steps of:
   dividing a laser beam from a laser beam source into an object beam and a reference beam in a condition that the optical fiber block and the microlens substrate have been fixedly secured;
   causing the object beam to enter the optical fiber held by the optical fiber block;
   collimating or condensing the object beam from the optical fiber by the microlens to cause the collimated beam to emit from the microlens substrate;
   forming a photo-refractive material layer in advance on a surface of the microlens substrate or in the vicinity thereof;
   superimposing the object beam on the reference beam in the photo-refractive material layer; and
   forming a diffraction grating corresponding to the strength of light intensity caused by the superimposition on the photo-refractive material layer.

7. A method of forming an optical module having an optical fiber black in which a plurality of optical fibers is arranged in one or two-dimensional way and a microlens substrate in which a plurality of microlenses corresponding to the plurality of optical fibers is provided in one or two-dimensional way, comprising the steps of:
   dividing a laser beam from a laser beam source into an object beam and a reference beam in a condition that the optical fiber block and the microlens substrate have been fixedly secured;
   causing the object beam to enter each optical fiber;
   collimating or condensing the object beam from each optical fiber by the corresponding microlens to cause the collimated beam to emit from the microlens substrate;
   forming a photo-refractive material layer in advance on a surface of the microlens substrate or in the vicinity thereof;
   superimposing the object beam on the reference beam in the photo-refractive material layer; and
   forming a diffraction grating corresponding to the strength of light intensity caused by the superimposition on the photo-refractive material layer.

8. The method of forming an optical module according to claim 6, wherein the reference beam is a collimated beam with a light flux cross-sectional area covering an effective area of the entire microlens substrate.

9. The method of forming an optical module according to claim 6, wherein the reference beam is a collimated beam with a light flux cross-sectional area covering an effective area of each microlens of the microlens substrate.

10. The method of forming an optical module according to claim 8, wherein the Gaussian beam waist of the collimated reference beam is spaced apart a predetermined distance from the diffraction grating or the microlens substrate.

11. The method of forming an optical module according to claim 8, wherein the reference beam is a divergent spherical wave diverging from a position spaced apart a predetermined distance from the diffraction grating or the microlens substrate.

12. An optical module emitting the light incident from one optical system toward another optical system comprising:
   an optical fiber block therein holding a plurality of optical fibers arranged in one or two dimensional way therein; and
   a transparent block whose surface comes into contact with the optical fiber block, wherein a plurality of diffraction gratings are provided on a surface of the transparent block opposite to the optical fiber block so as to correspond to the optical fibers, and the diffraction gratings have a function of collimating or condensing the light emitted from the optical fibers of one optical system toward the another optical system and causing the light to emit such that the optical axis of the light is parallel with respect to each other, or condensing the light incident from the another optical system toward an end surface of the optical fiber.

13. An optical module emitting the light incident from one optical system toward another optical system comprising:

an optical fiber block holding a plurality of optical fibers arranged in one or two dimensional way therein; and a transparent block spaced apart a predetermined distance from the optical fiber block, wherein a plurality of diffraction gratings are provided on a surface of the transparent block opposed to the optical fiber block so as to correspond to the optical fibers, and the diffraction gratings have a function of collimating or condensing the light emitted from the optical fibers of one optical system toward the another optical system and causing the light to emit such that the optical axis of the light is parallel with respect to each other, or condensing the light incident from the another optical system toward an end surface of the optical fiber.

14. The optical module according to claim 12, wherein the optical fiber block has a plurality of optical fibers arranged in one or two-dimensional way therein, while the transparent block has diffraction gratings corresponding to the plurality of optical fibers arranged in one or two-dimensional way.

15. The optical module according to claim 12, wherein the optical fiber block and the transparent block are fixedly secured to a based.

16. The optical module according to claim 12, wherein the diffraction grating is made of a photo-refractive material of which the refractive index changes according to the intensity of light and the change is fixed.

17. A method of forming an optical module emitting the light incident from one optical system toward another optical system comprising the steps of:

causing an optical fiber block holding an optical fiber therein to come into contact with a transparent block of which one surface is provided with a photo-refractive material layer so that the photo-refractive material layer is situated on the opposite side of the optical fiber;

dividing a laser beam from a laser beam source into an object beam and a reference beam;

causing the object beam to enter the optical fiber held by the optical fiber block;

superimposing the object beam from the optical fiber on the reference beam in the photo-refractive material layer; and forming a diffraction grating corresponding to the strength of light intensity caused by the superimposition on the photo-refractive material layer.

18. A method of forming an optical module emitting the light incident from one optical system toward another optical system comprising the steps of:

having an optical fiber block holding an optical fiber therein spaced apart a fixed interval from a transparent block of which one surface is provided with a photo-refractive material layer so that the photo-refractive material layer faces the optical fiber block;

dividing a laser beam from a laser beam source into an object beam and a reference beam;

causing the object beam to enter the optical fiber held by the optical fiber block;

superimposing the object beam from the optical fiber on the reference beam in the photo-refractive material layer; and forming a diffraction grating corresponding to the strength of light intensity caused by the superimposition on the photo-refractive material layer.

19. The method of forming an optical module according to claim 17, wherein the reference beam is a collimated beam with a light flux cross-sectional area covering an effective area of the entire transparent block.

20. The method of forming an optical module according to claim 17, wherein the reference beam is a collimated beam with a light flux cross-sectional area covering an effective area of each diffraction grating of the transparent block.

21. The method of forming an optical module according to claim 19, wherein the Gaussian beam waist of the collimated reference beam is spaced apart a predetermined distance from the diffraction grating formed.

22. The method of forming an optical module according to claim 19, wherein the reference beam is a divergent spherical wave diverging from a position spaced apart a predetermined distance from the diffraction grating formed.

* * * * *